United States Patent Office 2,786,126
Patented Mar. 19, 1957

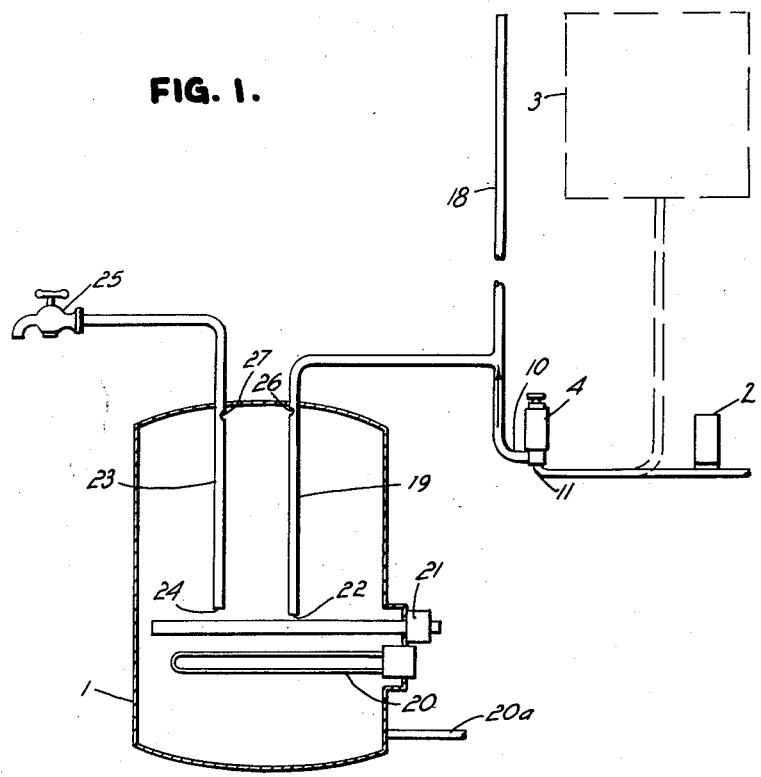

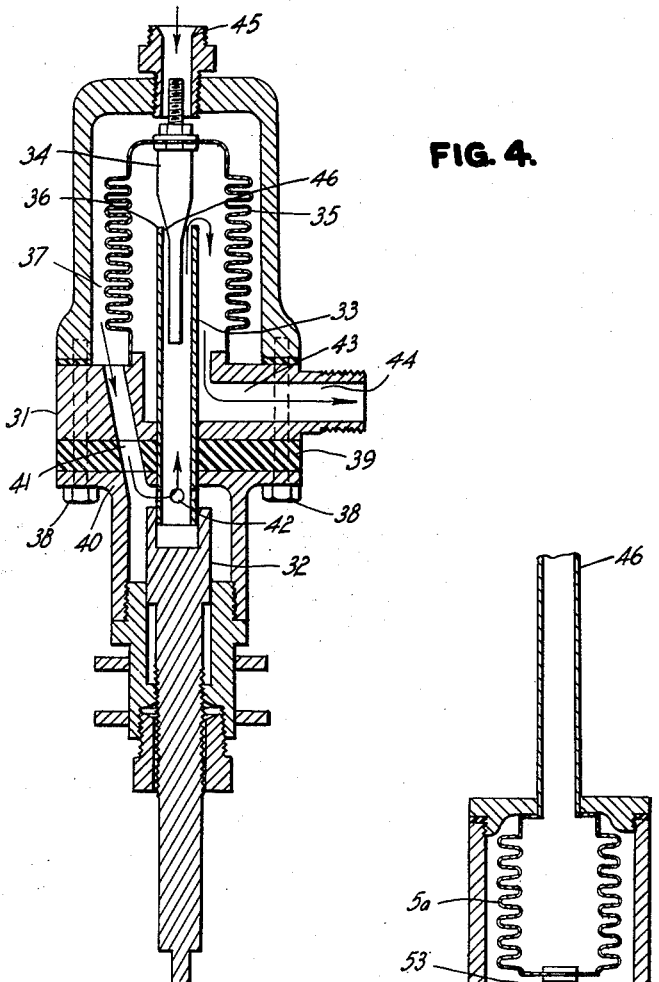
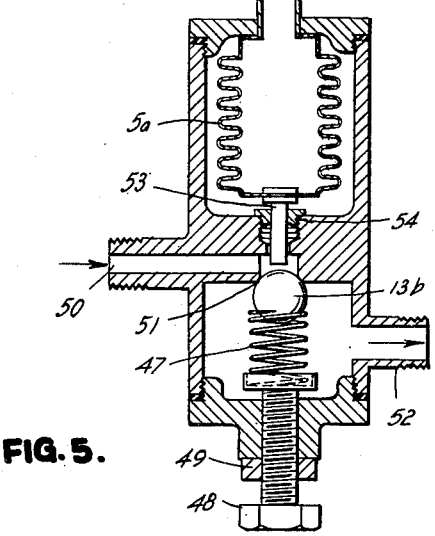

2,786,126

WATER HEATING APPARATUS, AND AN IMPROVED PRESSURE ACTUABLE VALVE THEREFOR

Owen Murray Kendon, Remuera, Auckland, New Zealand

Application October 18, 1955, Serial No. 541,254

20 Claims. (Cl. 219—38)

This invention relates to water heating and hot water supplying apparatus of the type comprising a container adapted to receive and hold a volume of water under a pressure greater than atmospheric pressure, means adapted to control said pressure, inlet means adapted to admit water into the container, water heating means associated with the container and adapted to raise substantially the whole of the volume of water to a temperature above 212° F., thermostatic control means adapted to so control the water heating means as to prevent the volume of water from reaching the temperature at which it boils under the pressure to which it is subjected, controllable outlet means through which water may be discharged by the steam pressure generated in the container, and means whereby the supply of water to the container is controllable so that the rate of flow of water into the cylinder through said inlet means is restrictable to prevent incoming water unduly cooling the contents of the container. The invention also relates to pressure actuable valves for apparatus of the type described.

In my earlier United States patent specification No. 245,403, now abandoned, I have disclosed a water heating apparatus of the type described which is of particular value in installations for tea making, e. g. for domestic and other purposes, and for sterilising and such like purposes.

However, it has been found that although the water heating apparatus referred to above is satisfactory in many respects, a part of the apparatus, namely the manually controlled needle valve disclosed in the complete specification of that patent, does not, in some circumstances, meet all requirements which it must fulfill for completely satisfactory service.

It is, therefore, an object of the present invention in one aspect to provide apparatus of the type described which includes a pressure actuable valve which is actuable so that the rate of flow of water into the apparatus is such that the incoming water cannot cool the stored water below the desired temperature.

Accordingly in one aspect the invention consists in water heating and hot water supplying apparatus of the type described wherein said means whereby the supply of water to the container is controllable comprise a pressure actuable valve means so connected to said container and said means adapted to admit water into said container, that on the pressure or temperature within the container falling below a substantially predetermined value said valve means will wholly or partially prevent ingress of water to said container, and on the pressure or temperature in the container rising to a substantially predetermined pressure said valve means will allow the ingress of water.

It is a further object of the present invention in a further aspect to provide a pressure actuable valve means for use in water heating and hot water supplying apparatus of the type described, which valve means will enable the rate of ingress of water to the water heating apparatus to be controlled in a satisfactory, yet economical manner.

Accordingly in a further aspect the invention consists in pressure actuable valve means for water heating and hot water supplying apparatus of the type described, said valve means being adapted to be mounted in the inlet means adapted to admit water into the container of the water heating apparatus, and comprising a valve body, a flexible member in said body, one side of which is sensitive, in use, to the pressure or temperature within said container and the other side of which is capable of being subjected to an opposing force, and a valve member and associated orifice mounted in said valve body, said flexible member being connected to and controlling said valve member which coacts with said orifice to control the flow of water, the construction and arrangement being such that in use on the pressure in the container increasing above a predetermined pressure, said valve member is moved to a position relative to said orifice which allows the ingress of water and when the pressure in the water heating apparatus falls below said predetermined pressure said valve member is moved to a further position in which the ingress of water is prevented or substantially prevented.

In apparatus of the type described, since the container is not open at the upper surface thereof to the atmosphere, provision must be made to allow for the bleeding of air from the container to the atmosphere.

It is, therefore, an object of the present invention in a still further aspect to provide means for association with apparatus of the type described which will enable the air to be bled from the container in a satisfactory yet economical manner.

Accordingly, in a still further aspect the invention consists in water heating and hot water supplying apparatus of the type described wherein air bleeding means are provided comprising passage means connecting the top of the interior of the container to the atmosphere through pressure retaining means, the construction and arrangement being such that in use air collecting near the top of the container is bled through said passage means for delivery to the atmosphere, either automatically or automatically during delivery of a quantity of water from said controllable outlet means.

One preferred form of the invention and modifications thereof will now be described with reference to the accompanying drawings in which:

Figure 1 is a diagrammatic sketch of a water heating and hot water supplying apparatus constructed according to the present invention, Figure 2 is a vertical cross section through a pressure actuable valve constructed according to the invention, Figure 3 is a sketch view of an alternative form of air bleeding means, Figure 4 is a vertical cross section through an alternative and less preferred form of valve means and Figure 5 is a vertical section through a further alternative form of valve means.

Referring to the drawings a container 1 is provided, which is adapted to receive and hold a volume of water under a pressure greater than atmospheric pressure. A permanent water supply supplies water at a desired pressure e. g. through an inlet means comprising a pressure reducing valve 2 or alternatively from a header tank 3 which controls the maximum pressure in the container, this pressure being set, for example, to about six pounds per square inch above atmospheric pressure by adjustment of the pressure reducing valve or by adjustment of the height of the tank 3.

The container 1 is connected to the pressure reducing valve or header tank through means whereby the supply of water to the container is controllable so that the rate of flow of water is restrictable to prevent incoming water unduly cooling the contents of the container, said means comprising a pressure actuable valve constructed as follows. This valve has a valve body 4 (Fig. 2) to which is attached one end of a pressure actuable member comprising a bellows type diaphragm 5. A rod 6 is attached to the other end 7 of the diaphragm. Surrounding the bellows type diaphragm is a chamber 8 which is screwed to the valve body and made water-tight by a fibre washer 9. The outer surface of diaphragm 5 is sensitive to pressure in the container 1 by being exposed to that pressure. The inlet 11 to the valve means is through one arm of a T connection 12 having a ball 13 and associated orifice 13a and the outlet 10 is taken off from the opposite side of the ball from the inlet 11. Water at the pressure at which it is admitted to the outlet 10 is admitted to the chamber 8 through the clearance between a hole 14 and rod 6 which passes through this hole. When the rod 6 is withdrawn from contact with the ball, the latter still acts as a check valve preventing flow of water from the container to the water supply pipe. An opposing force is given by spring means comprising a compression spring 15 fitted so that one end bears on the floating end 7 of the diaphragm and the other end bears on an adjustment screw 16, which is threaded through the centre of the valve body 4. A lock nut 17 is provided. The pressure of the water in chamber 8 on the outside of the bellows diaphragm 5 withdraws the end 6a of the rod 6 from contact with the ball 13 thus allowing ingress of water, and the coil spring can be compressed by the adjustment screw to increase or decrease the pressure required to close the ball 13 on its seat 13a. The inlet 11 is connected to the water supply pressure reducing valve 2 or the header tank 3, referred to above; and the outlet 10 connected to the container via a portion of an expansion pipe 18 (Fig. 1).

The expansion pipe 18 provides means adapted to control the pressure in the container 1, and gives a safety factor in the event of the heating element not switching off at the desired temperature, and allows air into the container 1 in the event of cooling when partly empty. The pipe 18 is continued to a suitable height to maintain hydrostatically the pressure required within the container.

The inlet 19 of the container is a tube which enters the upper part of the container and projects internally downward towards the bottom of the container, but below the inlet are disposed the water heating means which comprises an electric heating element 20 and the thermostatic control means which comprise a thermostatically operated switch 21. The heating element is placed nearest the bottom of the container. The thermostatic switch is disposed just above the heating element and attached thereto and the lower end of the inlet tube is disposed just above the thermostatic switch. The reason for the lower end 22 of the inlet tube 19 being just above the thermostat is so that the thermostat will respond more readily to the entry of cool water which flows from the inlet downwardly over the thermostat. Furthermore, since the thermostat is just above and attached to the heating element, it will be affected by hot water rising from the element and by direct conduction through the metal and will switch sooner than if disposed some distance away. These arrangements enable the temperature in the container to be closely controlled.

Controllable outlet means from the container are provided comprising a tube 23 which passes from within the container above the level of the thermostat. The inlet end 24 is just above the level of the lower end 22 of the inlet tube 19. Thus the actual intake of the outlet means is at a level just above the level of the inlet to the container. The outlet means continues outside the container. This continuation passes upwards from the uppermost level of the container and terminates in a tap 25 which is suitably constructed to direct the flow of water downwardly from this continuation of the outlet means. To provide air bleeding means so that air collecting near the top of the interior of the container may be bled to the atmosphere, inside the container but at or near the top thereof, a passage means including a restricted orifice 26 is provided connecting the top of the interior of the container to pressure retaining means comprising a pipe passing upwardly to atmosphere from the top of the interior of the container and in the preferred form this pipe comprises the expansion pipe 18.

Alternatively an orifice 27 may be provided connecting the upper part of the interior to the outlet pipe 23. When the small orifice 26 having an area of say .001 sq. in., i. e. about a say 1/32" dia. hole communicates between the top of the container and the expansion pipe 18, it will retain the pressure in the container because of the hydrostatic pressure of water in the expansion pipe 18 and air will be automatically bled. When the small orifice 27 communicates with the outlet means, it will, when the tap is turned on, restrict the passage of steam sufficiently for water to be forced up the outlet pipe and out of the outlet tap. Air will be automatically bled when the tap 25 is opened.

As an alternative air bleeding means a one way check valve could be provided, constructed as follows. A disc or ball valve 28 (Fig. 3) normally held by gravity in the open position, is provided in a tube 29 communicating with the top of the container interior, and with either the inlet or outlet means shown at 30. With the valve in its normal open position air will pass through the valve into either the inlet or outlet means. If it is in the inlet pipe, air will, in the upward direction of that pipe, pass the T, and continue automatically to atmosphere through the expansion pipe; on the other hand, if the supply of water is cut off, and steam tries to escape to atmosphere, the valve will be closed by the passage of steam round it, and the steam pressure acting on the surface of the water in the container will force water up the expansion pipe to a height at which water pressure will balance the steam pressure. The valve will then open again and the air be allowed to bleed out as usual. If the valve tube 29 communicates with the outlet means, the normal open position of the air-bleed valve, maintained while the outlet tap is closed, will allow air to rise into the outlet pipe and displace water therein. When the outlet tap is turned on the valve will be moved onto its seat by the passage of steam around it, and the steam pressure acting on the surface of the water in the container will force water up the outlet means and out of the outlet tap, carrying any air with it.

The operation of the water heater with the air-bleed connected to the inlet pipe 19 is as follows. The supply of water to the container is turned on and the tap 25 turned on. The ball in the valve means is released from the fully closed position by lifting the pin attached to the diaphragm. Thus the container partly fills with water and as soon as some water flows from tap 25, the pin is released, tap 25 is turned off and the heating means switched on. When steam pressure opens the valve, water will flow in slowly, and air present in the container is driven off through the air bleed and through the air vent pipe by the flow of water into the container.

When the container is full of water, pressure within the container will build up until it is equal to the pressure set by the pressure control valve 2 or header tank, 3. In the example above this pressure will be about six pounds to the square inch above atmospheric pressure. The flow of water into the water heater container will then cease. The thermostat 21 may now be set to its operating temperature setting, approximately 230 degrees Fahrenheit. When the water is heated sufficiently the thermostatic switch will operate, switching off the power.

Water will have been heated to a pressure above atmospheric pressure and because of this, on opening the tap 25 water will be discharged from within the container by steam pressure.

On water flowing from the container the pressure will drop substantially instantaneously to, for example, a predetermined pressure of about 3½ lbs. per square inch above atmospheric pressure. The pressure actuated valve will remain open, allowing the inflow of water, and the thermostatic switch will switch on the power to the heating element. As cool water is admitted the pressure in the container will drop to, for example, 3 lbs. per square inch, causing the pressure actuated valve to close. As a result the temperature of the water in the container will rise, and the steam pressure will increase, causing the valve to open again. Thus the rate of flow of water into the container is restricted to prevent the incoming water unduly cooling the contents of the container, because the temperature of the water in the container, since it controls pressure, also controls the rate of flow of water into the container, and the valve means is sensitive to the pressure in the container through one side of the diaphragm 5 being subjected to this pressure.

It is to be noted that water in any appreciable quantity may only be discharged from the outlet when there is sufficient steam pressure in the container. Should the steam pressure fall below atmospheric pressure, e. g. because the power is off, the pressure actuated valve closes, almost or entirely cutting off the supply of cold water, and because the tap is above the level of the container, no appreciable flow of water will be discharged. The valve closes completely when the pressure in the cylinder is about 3 lbs. per square inch above atmospheric pressure. This allows for slight variations in temperature between water at the top of the container and near the bottom of the container.

It is also to be noted that the air bleed valve or orifice allows for automatic bleeding of air during normal operation. If connected to inlet, air bubbles can make their way via the expansion pipe to atmosphere. If connected to outlet the normal opening of the outlet tap allows air collected in the outlet pipe to escape.

In an alternative form of construction, the substantially constant pressure to operate the valve diaphragm is provided by the water supply which, as described above, is maintained constant by the pressure valve 2 or the header tank 3. In this construction, referring to Figure 4, the valve means shown in that figure comprises a valve body 31 to which is attached the working parts of a normal type screw down valve. The stem 32 of this screw down type valve is provided with a tube 33 which passes through the valve body and projects on the other side thereof. Fitted in the open end of this tube is a tapered valve member or tapered needle 34 which is attached to a pressure actuated membrane comprising a bellows type diaphragm 35, the construction and arrangement being such that operated by the bellows type diaphragm, the tapered needle moves from a position in which the end 36 of the tube which end comprises the valve seat, is completely closed to a further position in which the tapered part of the needle valve is fully withdrawn from the valve seat. Intermediate positions give intermediate openings between the tube and the needle valve. Surrounding the bellows type diaphragm is an inlet chamber 37 which is attached to the valve body by suitable means, for example by four screws 38. A rubber gland 39 is interposed between the valve body 31 and the screw down part 40 of the valve, this gland providing a seal for the above mentioned tube, which passes through the gland. A passageway 41 passes from the inlet chamber through the valve body and through apertures 42 in the tube. A further passageway 43 is provided which connects the interior of the bellows type diaphragm to the outlet 44 of the valve. The inlet 45 to the inlet chamber is disposed co-axially with the tube and the tapered needle, this inlet being adjacent to and in line with the tapered needle. The flow of water through the valve is from the inlet chamber 37 around the outer periphery of the bellows type diaphragm, through the passage 41 in the valve body, through the apertures 42 in the tube, through the tube to the orifice 46 between the tube 33 and the tapered needle 34, into the interior of the valve diaphragm 35 and through the passage 43 in the valve body to the outlet 44. It will thus be seen that the pressure in the inlet chamber and the pressure within the bellows type diaphragm (the interior of the latter might be called the outlet chamber), are opposed one to the other and an increase of pressure in the interior of the diaphragm 35 will cause the valve to open and a decrease of pressure in the interior of the diaphragm 35 will cause the valve to close, the tapered needle giving varied areas of opening. Because the needle valve is coaxial with and adjacent to the inlet to the inlet chamber, the force due to the flow of water passing on to the top of the tapered needle valve through the inlet and the force due to the flow of water passing to the bottom of the tapered needle between the tapered part of the needle and the tube tend to cancel each other out, obviating or minimising water hammer. This valve is connected so that its inlet is connected to the water supply pressure reducing valve 2 or header tank 3 referred to above and its outlet connected direct to the cylinder.

The operation of this construction is of course clear from the foregoing, the difference being that the pressure applied by the spring 15 in Figure 2 is replaced by water pressure on the exterior of the diaphragm 35.

In a still further construction shown in Figure 5, the bellows 5a is sensitive to the temperature of the water in the container in the following way. The pressure within the bellows 5a is obtained from a capsule (not shown) filled with a suitable fluid which expands under heat and which is disposed within the container 1 and connected to the bellows 5a by pipe 46.

The opposing force on the ball 13b is provided by a spring 47 adjustably held by a screw 48 and locknut 49. The flow of water is from the water supply through inlet 50, ball valve part 51, to outlet 52 and then to the container 1. The rod 53 works in a gland 54.

In this construction if the temperature of the water and therefore the pressure of the fluid in the capsule rises, the bellows 5a is expanded to move the ball 13b away from its seat opening the valve and when the pressure falls the spring 47 pushes the ball into its seat closing valve.

The constructions described above give considerable advantages. For example, because the temperature in the container, through the pressure therein, or in the capsule, controls the rate of inflow of water, the rate of flow may be kept at or near its maximum for each particular set of conditions, e. g. if the temperature of incoming water is high the rate will be faster than if it is cold. If the voltage to the heating element 20 is low the rate of flow will decrease in proportion to the loss of power.

A further advantage in the provision of the pressure actuated valve is that because of its movement it does not tend to be blocked up by silt or the like as compared with the restriction obtained by using a small orifice or an ordinary fixed position manually controlled valve. Other advantages of the invention will be obvious from the foregoing.

What I claim is:

1. Pressure actuable valve means for water heating and hot water supplying apparatus of the type described, said valve means being adapted to be mounted in the inlet means adapted to admit water into the container of the water heating apparatus and comprising a valve body, a flexible member in said body one side of which is sensitive, in use, to the pressure or temperature within said container and the other side of which is capable of being subjected to an opposing force and a valve member and associated orifice mounted in said valve body, said flexible member being connected to and controlling said valve member which coacts with said orifice, to control the flow of water, the construction and arrangement being such that in use on the pressure or temperature in the container increasing above a predetermined pressure or temperature, said valve member is moved to a position relative to said orifice which allows the ingress of water and when the pressure in the water heating apparatus falls below said predetermined pressure or temperature said valve member is moved to a further position in which the ingress of water is prevented or substantially prevented.

2. Pressure actuable valve means as claimed in claim 1 wherein said opposing force is provided by spring means.

3. Pressure actuable valve means as claimed in claim 1 wherein said spring means comprises a compression spring one end of which bears on said flexible member and the other end of which is adjustably associated with the valve means substantially as described.

4. Pressure actuable valve means as claimed in claim 1 wherein said flexible member comprises a bellows diaphragm.

5. Pressure actuable valve means as claimed in claim 1 wherein said valve member comprises a ball and a rod is associated with said flexible member and adapted to engage said ball to substantially prevent ingress of water when the pressure in said container drops below said substantially predetermined pressure.

6. Pressure actuable valve means as claimed in claim 5 wherein said ball also acts as a check valve to prevent movement of water from the container to the water supply system.

7. Pressure actuable valve means as claimed in claim 1 wherein an inlet chamber and an outlet chamber are provided separated by said flexible member and wherein said substantially constant pressure on said flexible member is provided in use by the incoming water pressure in said inlet chamber.

8. Pressure actuable valve means as claimed in claim 7 wherein said flexible member is a bellows diaphragm.

9. Pressure actuable valve means as claimed in claim 7 wherein said valve member has a coned portion which coacts with the valve orifice so that varying positions of the valve member will give varying degrees of valve opening.

10. Pressure actuable valve means as claimed in claim 9 wherein said valve orifice is provided at the end of an axially adjustable tube, axial adjustment of which enables various valve openings to be provided for particular pressure differences in said inlet and outlet chambers.

11. Pressure actuable valve means as claimed in claim 1 wherein a capsule or the like means filled with fluid is adapted to be mounted within the water container, and wherein said flexible member is adapted to be moved to close said valve member on the pressure of said fluid increasing to a desired pressure.

12. Pressure actuable valve means as claimed in claim 11 wherein a rod is attached to said flexible member and adapted to move a ball from its seat to open the valve, said ball being returnable to its seat by a spring means.

13. Pressure actuable valve means as claimed in claim 12 wherein the force exerted by said spring means is adjustable substantially as described.

14. Water heating and hot water supplying apparatus wherein pressure retaining means are provided comprising an expansion pipe passing from a lower level within a container to a suitable height to maintain hydrostatically the pressure required within the container, and air bleed means associated therewith comprising passage means connecting the top of the interior of the container to said expansion pipe, the construction and arrangement being such that air collecting near the top of the container is bled through said passage means for delivery to the atmosphere.

15. Water heating and hot water supplying means as claimed in claim 14, wherein said passage means comprises an orifice of an area of approximately 0.001 square inch when an element of approximately 2000 watts is used.

16. Water heating and hot water supplying apparatus as claimed in claim 14 wherein said passage means comprises a one-way check valve normally held open by gravity.

17. Water heating and hot water supplying apparatus comprising a container, a controllable outlet means having a pipe which extends from the top of the container to a lower level of said container and which terminates in a tap, and air bleeding means comprising a passage means connecting the top of the interior of the container to said pipe, the construction and arrangement being such that air collecting near the top of the container is bled through said passage means for delivery to the atmosphere during delivery of a quantity of water from said controllable outlet means.

18. Water heating and hot water supplying apparatus as claimed in claim 17, wherein said passage means comprises an orifice of an area of approximately 0.001 when an element of approximately 2000 watts is used.

19. Water heating and hot water supplying apparatus as claimed in claim 17, wherein said passage means comprises a one-way check valve normally held open by gravity.

20. Water heating and hot water supplying apparatus of the type described wherein said means whereby the supply of water to the container is controllable comprise a pressure actuable valve means so connected to said container and said means adapted to admit water into said container, that on the pressure or temperature within the container falling below a substantially predetermined value said valve means will wholly or partially prevent ingress of water to said container, and on the pressure or temperature in the container rising to a substantially predetermined pressure or temperature said valve means will allow the ingress of water.

References Cited in the file of this patent

UNITED STATES PATENTS

| 1,699,668 | Meyer | Jan. 22, 1929 |
| 1,715,512 | Rochester | June 4, 1929 |
| 1,731,058 | Pierson | Oct. 8, 1929 |
| 1,920,284 | Wells | Aug. 1, 1933 |
| 1,942,559 | Lithman | Jan. 9, 1934 |

OTHER REFERENCES

Brayman: Tech. Eng'g. News, May 1942, pp. 342–5, 364.